United States Patent [19]
Rockstroh et al.

[11] Patent Number: 5,438,441
[45] Date of Patent: Aug. 1, 1995

[54] METHOD AND APPARATUS FOR MATERIAL PROCESSING WITH A LASER CONTROLLED BY A HOLOGRAPHIC ELEMENT

[75] Inventors: Todd J. Rockstroh, Maineville; Seetharamaiah Mannava, Cincinnati, both of Ohio

[73] Assignee: General Electric Company, Cincinnati, Ohio

[21] Appl. No.: 989,749

[22] Filed: Feb. 1, 1993

Related U.S. Application Data

[63] Continuation of Ser. No. 799,801, Nov. 29, 1991, abandoned.

[51] Int. Cl.6 .......................... G02B 5/32; B23K 26/06
[52] U.S. Cl. ........................................ 359/15; 359/27; 219/121.6; 219/121.7; 219/121.74
[58] Field of Search ................ 359/15, 19, 25, 1, 16, 359/35, 27; 219/121.6, 121.7, 121.74, 121.75, 121.76

[56] References Cited
U.S. PATENT DOCUMENTS

| | | | |
|---|---|---|---|
| 3,617,702 | 11/1971 | Flournoy | 359/15 |
| 3,712,813 | 1/1973 | Ross et al. | 430/1 |
| 3,807,829 | 4/1974 | Close | 359/19 |
| 4,138,190 | 2/1979 | Bryngdahl | 359/15 |
| 4,964,698 | 10/1990 | Rowlette | 359/27 |

OTHER PUBLICATIONS

Collier, et al., *Optical Holography*, Academic Press, New York 1971. pp. 35, 58–78.
Dakss et al, "Laser Multiple Hole Drilling," *IBM Technical Disclosure Bulletin*, vol. 13, No. 7, Dec. 1970, p. 1994.
J. M. Moran, "Laser Machining with a Holographic Lens," *Applied Optics*, vol. 10, No. 2, Feb. 1971, pp. 412–415.

*Primary Examiner*—Loha Ben
*Assistant Examiner*—John Juba, Jr.
*Attorney, Agent, or Firm*—Andrew C. Hess; Bernard E. Shay

[57] ABSTRACT

Apparatus and method for performing material processing, such as drilling or welding, with a high intensity laser beam operating in the infrared spectrum, using a reflective holographic optical element (HOE) the surface of which is prepared to contain an image of the object under processing and energy intensity information, the object can be located in or out of line-of-sight with respect to the emitted laser beam.

10 Claims, 7 Drawing Sheets

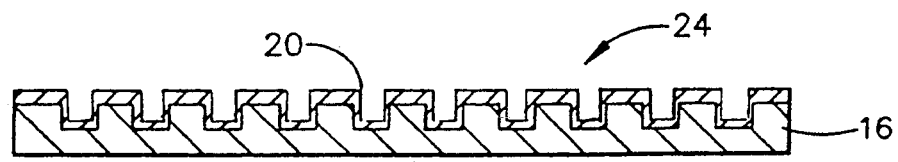
FIG. 1e
FIG. 1f
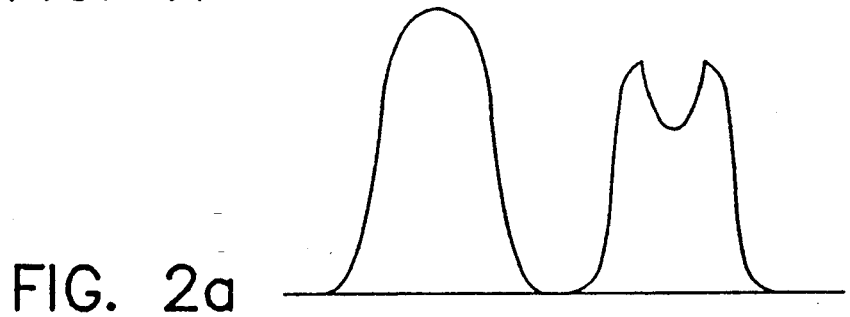
FIG. 2a
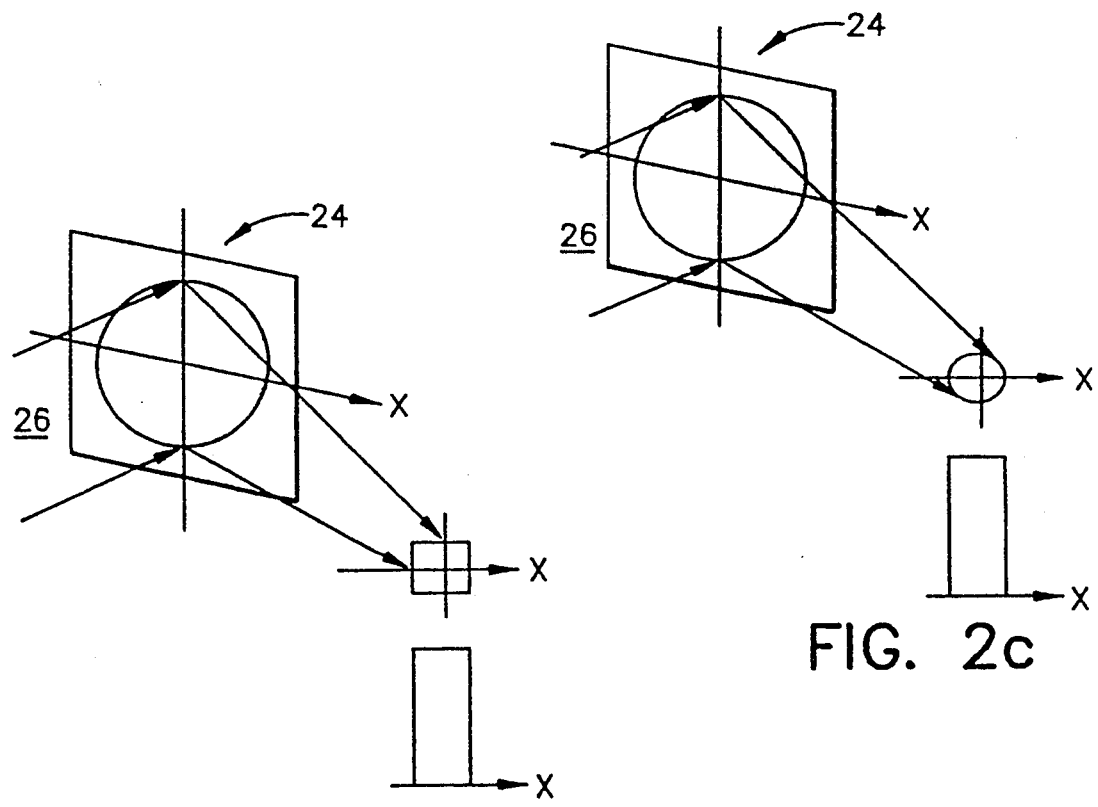
FIG. 2b
FIG. 2c

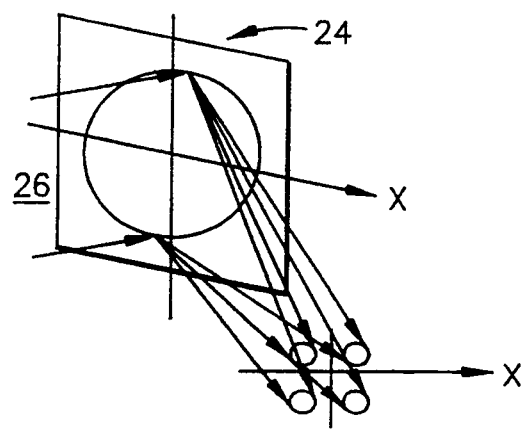
FIG. 2e
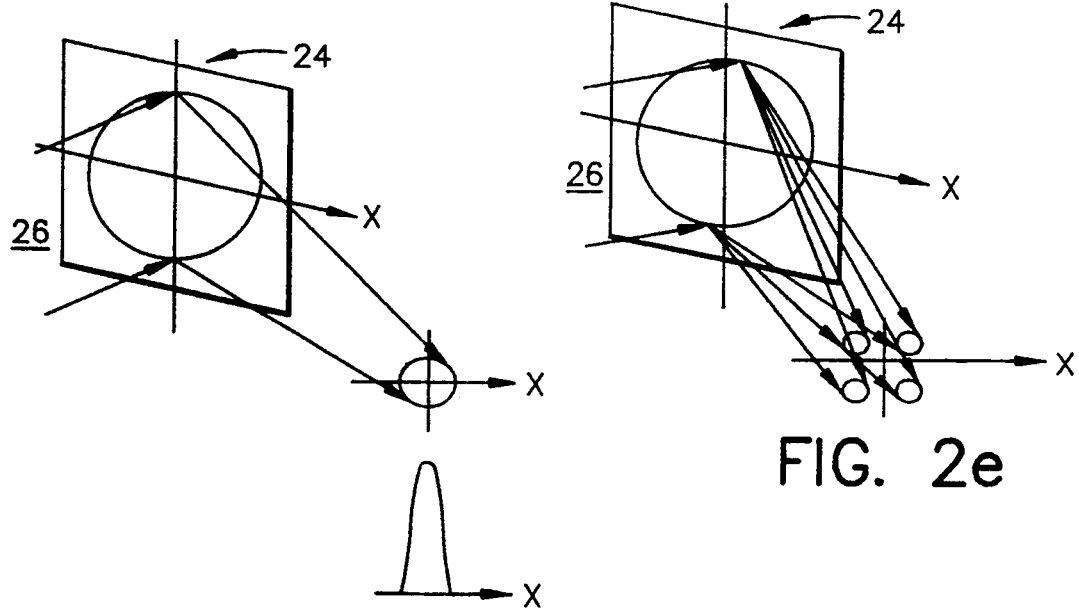
FIG. 2d
FIG. 2g
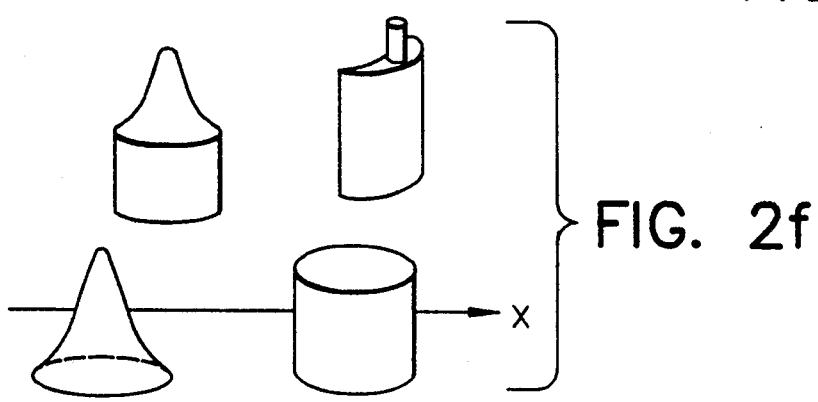
FIG. 2f

METHOD AND APPARATUS FOR MATERIAL PROCESSING WITH A LASER CONTROLLED BY A HOLOGRAPHIC ELEMENT

This application is a Continuation of application Ser. No. 07/799,801 filed Nov. 29, 1991, now abandoned.

FIELD OF THE INVENTION

The present invention relates generally to a method and apparatus for material processing with laser and, it relates more particularly, to a method and apparatus for material processing with a laser beam controlled by a holographic element.

BACKGROUND OF THE INVENTION

Material processing with lasers has been well known in the area of heat treatment, welding, cutting and drilling. Such applications typically involve the imaging of the emitted laser beam into a small focus area at a sufficient intensity required by the particular application. For focussing, generally optics are used which may be of the simple spherical, cylindrical or of the most recent binary/refractive types.

These types of classical optics are generally limited to imaging the cross-sectional intensity of the incident laser beam into a smaller or larger focus. Thus a round laser beam is limited to drilling round holes without further manipulation of the workpiece. The binary/refractive optics have circumvented some of the imaging limitations by being able to transform simple cross-sectional intensity profiles into other simple cross-sectional profiles, such as, disk to ring, Gaussian to top hat, etc.

In the area of welding, the classical weld joints, such as, butt, lap, etc., can be now accomplished with a laser. The weld itself can be made autogenously or with the addition of material into the weld seam. The added material typically is in the form of a powder for lasers and wire for other welding technologies. Because the laser is typically delivered to the workpiece via a numerically controlled machine tool, the working process is readily automated.

In one of the areas of application involving aircraft engine turbine components, when material is added to a narrow, curving geometry of a workpiece, it is critical to deliver the proper amount of energy at a proper translation speed of the workpiece and/or the laser focus. The laser focus itself must be accurately aligned to the individual component of the workpiece, which typically requires that the laser focus path be individually programmed for each component. Also, attempts have been made to focus the laser beam onto the workpiece by an optical system involving mirrors. It is well known that a mirror can be used for prefocussing or reflection, however, when a mirror is used to focus a high intensity beam, it is susceptible to frequent damage due to the close proximity of the actual laser processing location. Such additional manufacturing steps make the use of such known technology time consuming, costly and prone to errors.

Such shortcomings of laser beam imaging and focussing appear to have been overcome in some limited areas of manufacturing, such as demonstrated by U.S. Pat. No. 3,617,702 issued Nov. 2, 1971 to Philip Flournoy and entitled Apparatus and Method for Perforating Sheet Material, wherein a reflective holographic optical element (HOE) is used for imaging hole-like patterns onto a moving plastic sheet material and perforating the plastic material where such images impinge thereon. The teaching of this patent is specifically intended to be incorporated herein by reference for enabling one skilled in the art to understand the present invention without the disclosure of extraneous material.

It has been known that HOEs inherent in their method of making can be classified as transmissive or reflective HOEs. The making of such reflective HOE and its use in a relatively low-power application has been described in the referenced patent. It is also known that most high power lasers are at infrared wavelengths between 1 and 10 micrometers. There are no known photoemulsions which would be of sufficient resolution and sensitivity to record a HOE in the infrared spectrum.

OBJECTS AND SUMMARY OF THE INVENTION

It is, therefore, an object of the present invention to provide an apparatus for using a reflective HOE capable of operating with a laser beam in the infrared spectrum and to direct the incident laser beam onto a workpiece or on its component part located in or out of line-of-sight and to perform a changing of the image and of the intensity profile of the incident beam.

It is another object of the present invention to provide an apparatus for using a reflective HOE capable of operating with a laser beam in the infrared spectrum and to direct the incident laser beam onto a workpiece or on its component part located in or out of line-of-sight and to perform a multiple task material processing by the use of the same HOE and the same incident beam.

It is a further object of the present invention to provide an apparatus for using a reflective HOE capable of operating with a laser beam in the infrared spectrum and to direct the incident laser beam onto a workpiece or on its component located in or out of line-of-sight and to perform simultaneously a multiple drilling operation of similar or dissimilar profile holes on the workpiece by using the same HOE and the same incident beam.

It is still another object of the present invention to provide an apparatus for using a reflective HOE capable of operating with a laser beam in the infrared spectrum and to direct the incident laser beam onto a workpiece or on its component part located in or out of line-of-sight and to perform a welding operation on the workpiece.

It is still a further object of the present invention to provide an apparatus for using a plurality of reflective HOEs capable of operating with a laser beam in the infrared spectrum and to direct the incident laser beam simultaneously or in succession onto a workpiece or on its component part located in or out of line-of-sight and to perform each a partial welding operation on the workpiece.

It is yet another object of the present invention to provide a method of performing a single or multiple task material processing on a workpiece or on its component part located in or out of line-of-sight by using a reflective HOE capable of operating with a laser beam in the infrared spectrum by directing the incident beam onto the workpiece.

It is yet a further object of the present invention to provide a method of performing simultaneously a multiple drilling operation of similar or dissimilar profile holes on a workpiece or on its component part located in or out of line-of-sight by using a reflective HOE capable of operating with a laser beam in the infrared spectrum by directing the incident beam onto the workpiece.

It is yet a still further object of the present invention to provide a method of performing a single or multiple task welding operation on a workpiece or on its component part located in or out of line-of-sight by using a reflective HOE capable of operating with a laser beam in the infrared spectrum by directing the incident beam onto the workpiece.

Accordingly, the present invention provides an apparatus for performing a material processing operation on a workpiece or on its component part located in or out of line-of-sight by using a reflective HOE capable of operating with a laser beam in the infrared spectrum including means for positioning the HOE within or near the workpiece and to direct the incident laser beam onto the workpiece or on its component part, and means for supporting the workpiece in a predetermined relationship with the incident laser beam.

Accordingly, the present invention also provides a method of performing a material processing operation on a workpiece or on its component part located in or out of line-of-sight including the positioning of a reflective HOE capable of operating with a laser beam in the infrared spectrum within or near the workpiece, directing the laser beam at sufficient energy level onto the HOE for creating an image of the HOE image on the workpiece and thereby performing the processing operation.

According to the present invention a holographic optical element, hereinafter called HOE, can be recorded to transform the cross-sectional intensity profile of a known or unknown laser beam into an image having any desired cross-sectional shape and intensity profile. The sole limitation is that a given laser source should have sufficient power to impart sufficient energy density required for the particular material processing within the given area of the HOE image. Since the HOE is diffractive, the image can be located at nearly any angle with respect to the HOE, thus reducing line-of-sight requirements as compared to conventional and binary optics.

BRIEF DESCRIPTION OF THE DRAWINGS

The present invention will become more readily apparent from the following description of preferred embodiments and method thereof, shown and illustrated, by way of example, and described in reference to the accompanying drawings, in which:

FIGS. 1a–1f illustrate the steps of manufacturing a reflective high power HOE used according to the present invention;

FIG. 2a represents in a schematic fashion the intensity profile of the incident laser beam;

FIGS. 2b–2j illustrate in a schematic fashion the various profiles of holes which can be drilled with a HOE according to the present invention and the energy densities associated with the various hole profiles;

DESCRIPTION OF THE PREFERRED EMBODIMENTS

Figure 1A:
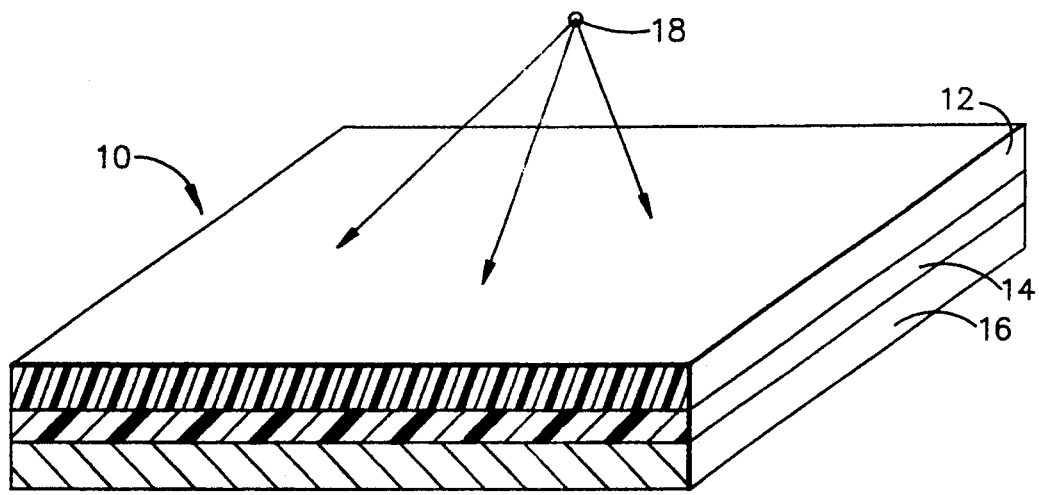
Figure 1B:
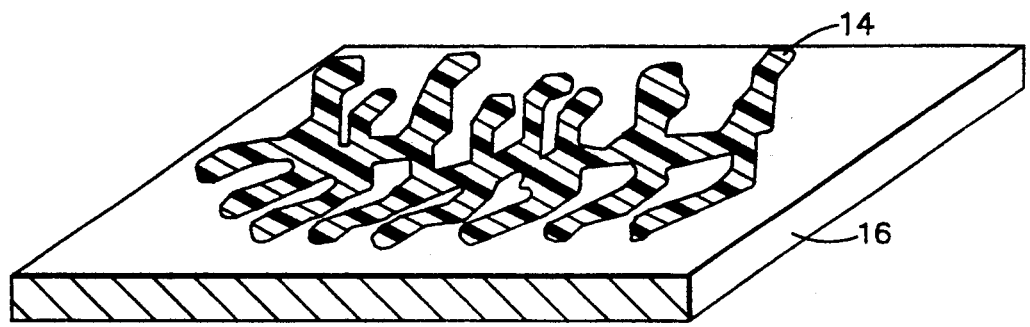

With reference to FIG. 1a illustrating the first step in making a high power reflective HOE, it is seen that a sandwich-like material is assembled from a HOE mask 12 which has been recorded in the visible spectrum where lasers and photo-sensitive emulsions are well documented, such as examplarily shown in the above referenced patent, which is then used to transfer the interference pattern of the recorded image onto a photoresist-type emulsion 14 that has been coated onto a metallic substrate 16. After exposure, the photoresist 14 is developed and, as a result, the substrate 16 will have transferred onto it the three dimensional interference pattern in relief on its surface, as shown in FIG. 1b. The next step is to either add material 20 to fill the spaces in the relief pattern, such as, by electroplating or vacuum deposition, as shown in FIG. 1c, or to etch channels 22 in the substrate material 16 exposed between the relief pattern, such as by ion or chemical processes, as shown in FIG. 1d.

Figure 1C:
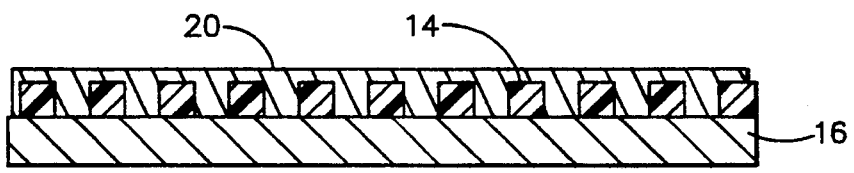
Figure 1D:
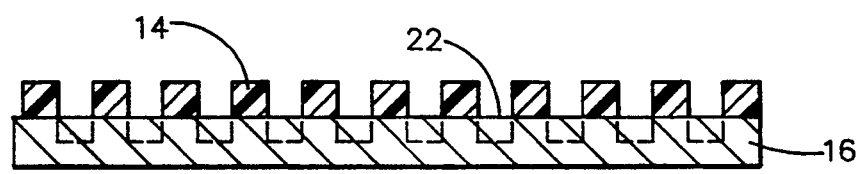

After the plating or etching process illustrated in FIGS. 1c and 1d, the photoresist 14 can be removed, resulting in a solid metal HOE or other material of sufficient thermal characteristics. If necessary, the final HOE 24 can be plated with a thin coating of highly reflective material 20 corresponding to a given reconstruction wavelength, as shown in FIG. 1e or be kept in its original state, as shown in FIG. 1f.

In connection with the above manufacturing steps it is noted and is well known, that the HOE prior to the above described steps, is recorded on high resolution photographic plates. Such photoplates are transmissive and, if used in low power applications, the laser beam passes through the HOE, to form an image at low laser powers. However, at high laser powers, and at 1.06 micrometer wavelengths, the photoplate or HOE is not transmissive, therefore, the absorption of laser energy would damage the HOE. Therefore the HOE is converted into a reflective HOE as in steps 1a–1f in FIG. 1 in which the surface is highly reflective to avoid damage problems and to deliver the full energy of the beam onto the workpiece.

It is well known that when the HOE mask is recorded in the visible wavelength spectrum in order that high resolution photographic emulsions could be used, as mentioned above, but reconstructed in the infrared wavelength when the HOE 24 is used in the actual manufacturing process, such reconstruction use will impart aberrations in the infrared image. In conjunction with the geometry calculations, the recording and reconstruction geometries can be altered to compensate the wavelength change effect. In other words, since the reconstruction geometry is known in advance due to the ultimate hardware geometry to be produced, and known are also the recording and reconstruction wavelengths, the visible spectrum geometry can be calculated and limited to several discrete geometries.

With reference to FIGS. 2a–2j illustrating the use of HOE 24 for redirecting the laser beam and focussing it onto a non line-of-sight location, when viewed from outside the workpiece geometry, it is seen that the incident laser beam 26 is delivered into the workpiece at a convenient and predetermined angle of attack, as will be also described in more detail in connection with FIG. 3. The HOE 24 is positioned within the workpiece 28 so that the laser beam is diffracted by the HOE 24 and imaged onto the proper location on the workpiece 28. Such locating of the HOE 24, the aligning of the beam 26 and the supporting of the workpiece 28 in predetermined relationship are performed by the CNC 52 (FIG. 6), as described later, and was calculated and incorporated into the recording geometry.

Figure 2H:
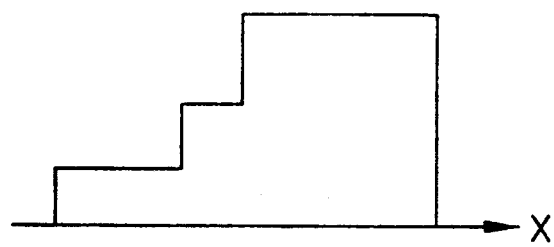

According to the present invention and with reference to the showing of FIGS. 2a-2j, the intensity profile of a given laser beam, such as, that of beam 26 can be altered. The cross-sectional intensity profile of the incident laser beam 26 is Gaussian or near Gaussian, such as illustrated by the two wave forms in alternative, on the x-axis in FIG. 2a. As it is known, the Gaussian intensity profile is a natural property of a given laser beam. If one were to look at the energy intensity across the laser beam, the intensity profile can be Gaussian with a centerline peak and lesser intensity in the radial direction. The intensity roll-off is proportional to $1/e^2$, which is the mathematical representation of the so called "Gaussian" profile. This profile can be disadvantageous to certain laser processes and, a more uniform intensity profile is desired, which the invention has resolved, by proposing the use of the HOE 24 according to the present invention. Since HOE 24 is diffuse, any area of any size on the HOE 24 contains information for the entire image. Thus, no matter what the intensity profile of the reconstruction laser beam is, the HOE 24 will focus the recorded image with a more uniform or integrated intensity profile. As shown in FIGS. 2b-2d, by substituting a differently recorded HOE 24 in each case for the HOE 24, the Gaussian profile beam could be imaged into a square (FIG. 2b) with the intensity profile shown below it on the x-axis, or round (FIG. 2c) having a cross-sectional area of more uniform power density at the surface of the workpiece. Such profiles in cross section and power density are accomplished by the recording of that profile and density information on the HOE 24 as described later. The image illustrated in FIG. 2d is a round image cross-section that the HOE 24 has imaged as a near Gaussian intensity distribution from some arbitrary intensity distribution, such as a wavefront with a "cavity" in the center shown in FIG. 2a which wavefront is characteristic of some high-power lasers.

Figure 2I:
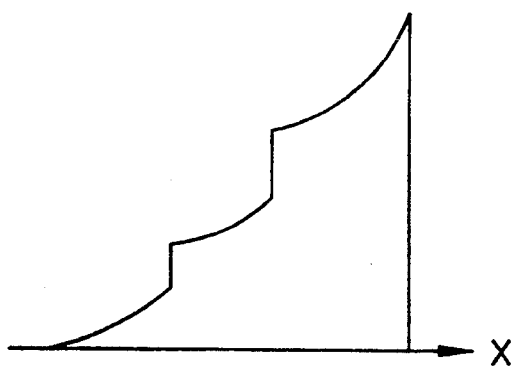
Figure 2J:
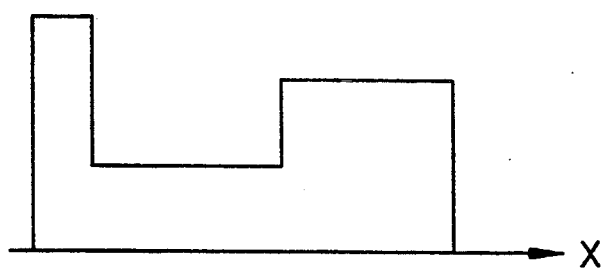

FIG. 2e illustrates the use of another HOE 24 to produce an image capable of material processing in a multirole pattern, such as drilling multiple holes. As shown in FIG. 2a below FIG. 2e, not only multiple holes can be drilled, but they can be of different size requiring different image intensities on the surface of the workpiece, which can be accomplished by the recording of the HOE 24 with shading. As shown in FIG. 2f, the HOE 24 can be recorded with any desired shape of the produced image, also with any desired intensity distribution within the image as illustrated by the showing of FIGS. 2h-2j. In other words, the HOE 24 can produce an image with an intensity which produces a fully drilled through passage as will be described in connection with FIG. 3, or cause partial removal of the material to produce recesses. By shading the various parts of the object or using masks on the object or using other photographic techniques to change the intensity profile of the object during recording of the HOE mask 12 in FIG. 1a, the same intensity profile will be established or recreated in the infrared image produced by the reflective HOE 24. The intensity distribution is limited only by the ability to fabricate the required object.

Figure 3:
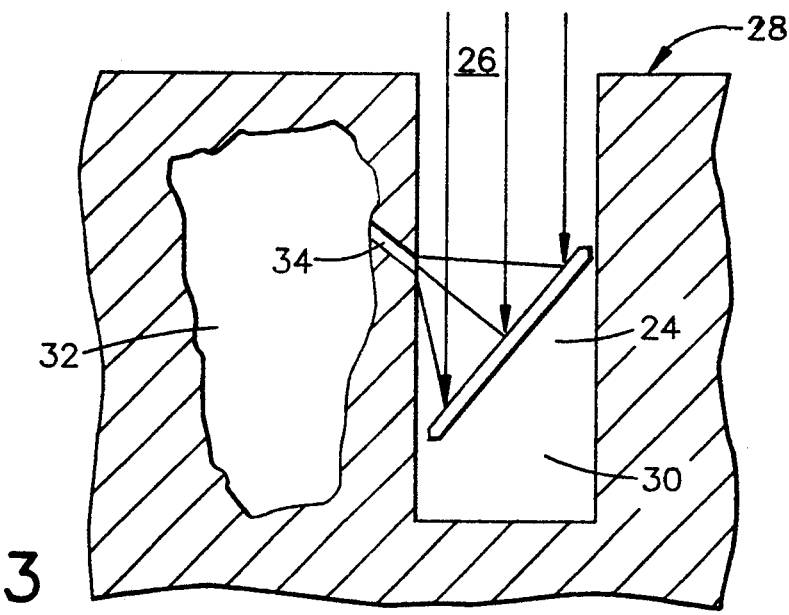
FIG. 3 illustrates in a schematic fashion the drilling application of a high power HOE according to the present invention in a restricted workpiece geometry.

Turning now to FIG. 3 illustrating a practical application of the high power HOE 24, namely drilling within a restricted geometry of a workpiece 28. As can be seen, the HOE 24 is positioned within a recessed channel 30 of the workpiece 28 such that the incident laser beam 26 will project the image to a predetermined area of the wall of the recess 30 where a hole 34 connecting the recess 30 with an internal cavity 32 of the workpiece, will be drilled. The positioning of the HOE 24 and its "focussing" of the beam 26 to the desired area of the workpiece is performed by the CNC 52 discussed in connection with FIG. 6 hereinafter. From the showing of FIG. 3 it can be seen that with the help of HOE 24 a hole 34 can be drilled which is completely out of line-of-sight for beam 26 and, which heretofore was performed by a complicated mirror system, the shortcomings of which have been discussed above.

Figure 4:
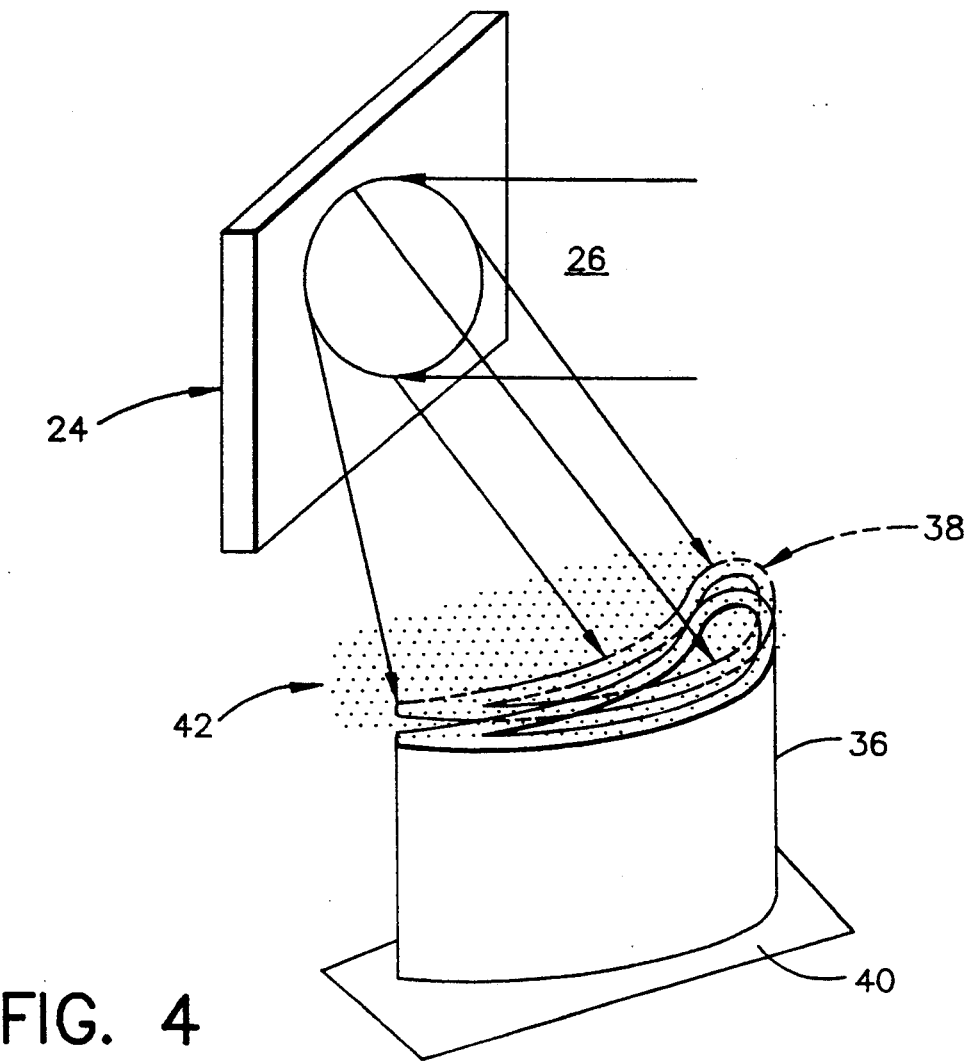
FIG. 4 illustrates schematically the welding application of the HOE according to the present invention and its imaging in a single step onto a turbine component.

Turning now to FIG. 4 illustrating another practical application of the HOE 24, namely the adding of material to the tip portion of a turbine component 36, such as a turbine blade, by the well known powder deposition 42 process, according to which the powder 42 from a reservoir or hopper (not shown) is gravity or screw fed into a plenum (not shown) from where it is carried by a gas onto the workpiece placed on a support means 40. The gas is not only a carrier, it is also inert or non-reactive to the welding process for weld integrity.

The powder is typically blown into the reflected laser beam 26 above the part to initiate some level of powder melting. Part of the laser beam is transmitted through the powder 42, hitting the workpiece 36 and creating the holographic image 38 and causing a thin (0.010" in typical applications) surface melt on the top surface of the workpiece 36. The molten powder then mixes with the surface melt of the workpiece resulting in a net surface buildup of approximately 0.030" or less. The process can be repeated several times to increase the overall buildup to over 0.25". In the illustrated embodiment of FIG. 4 the laser source is of sufficient power to cast an image 38 capable of imparting the welding process over the entire top surface or tip area of the workpiece 36 as shown. This would require that the laser source be capable of delivering an energy concentration of approximately $10^5$ Watts/cm$^2$ over the top surface or tip area.

Figure 5:
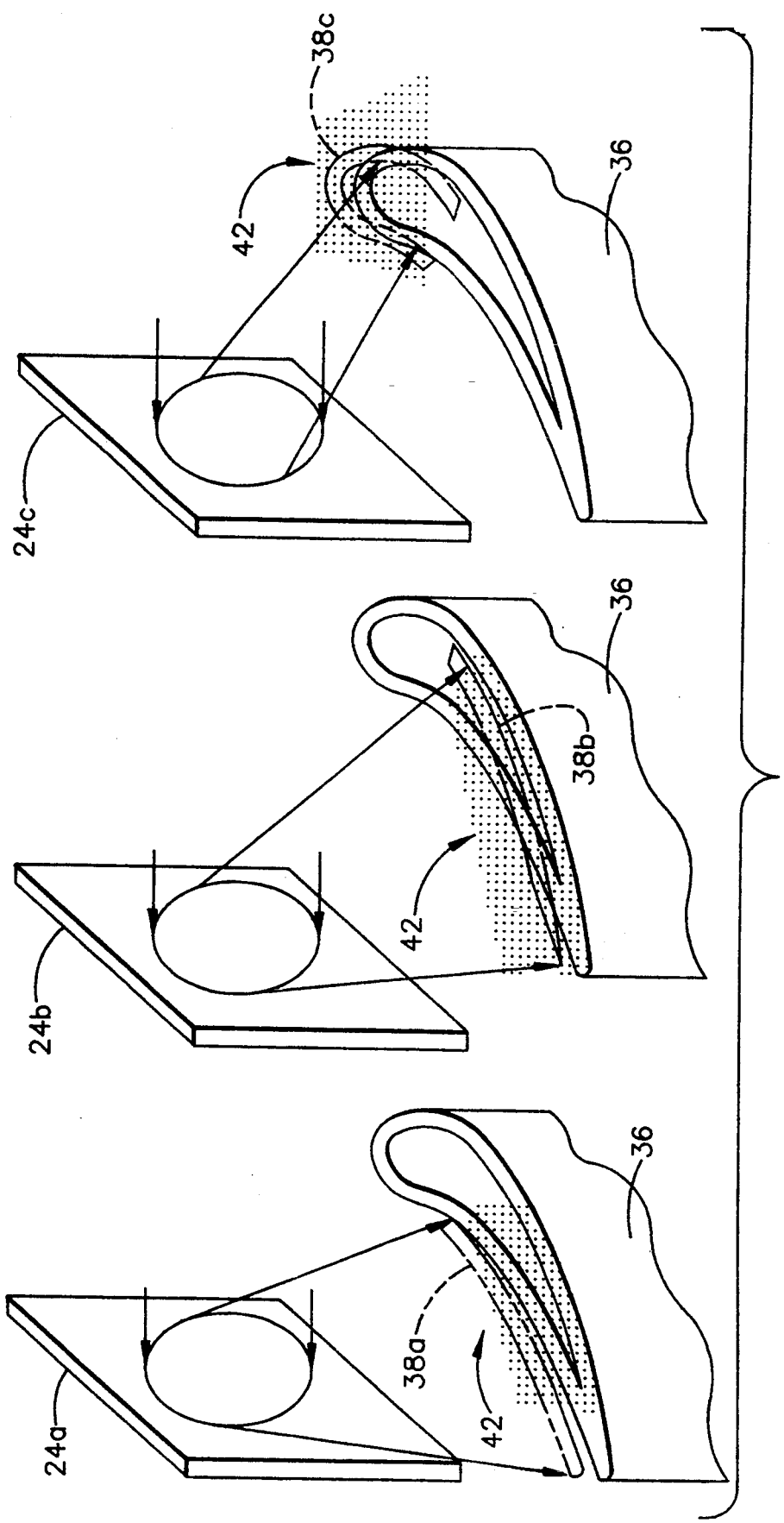
FIG. 5 is a similar illustration as in FIG. 4 except in multi-steps using multiple HOEs.

Turning now to another embodiment of the welding aspect of the present invention, reference is made to FIG. 5, which illustrates a situation where the tip area undergoing the welding is larger than the capability of the laser source. Therefore, several HOEs 24a, 24b and 24c should be used, which are sequentially positioned into the laser beam to irradiate individual areas of the top surface or tip, namely, creating the image 38 in partial arcs 38a, 38b and 38c, respectively. In other words, each of the HOEs 24a, 24b and 24c have been prepared to contain the image of a respective arc and, together, will accomplish the welding of the entire tip of the workpiece.

Figure 6:
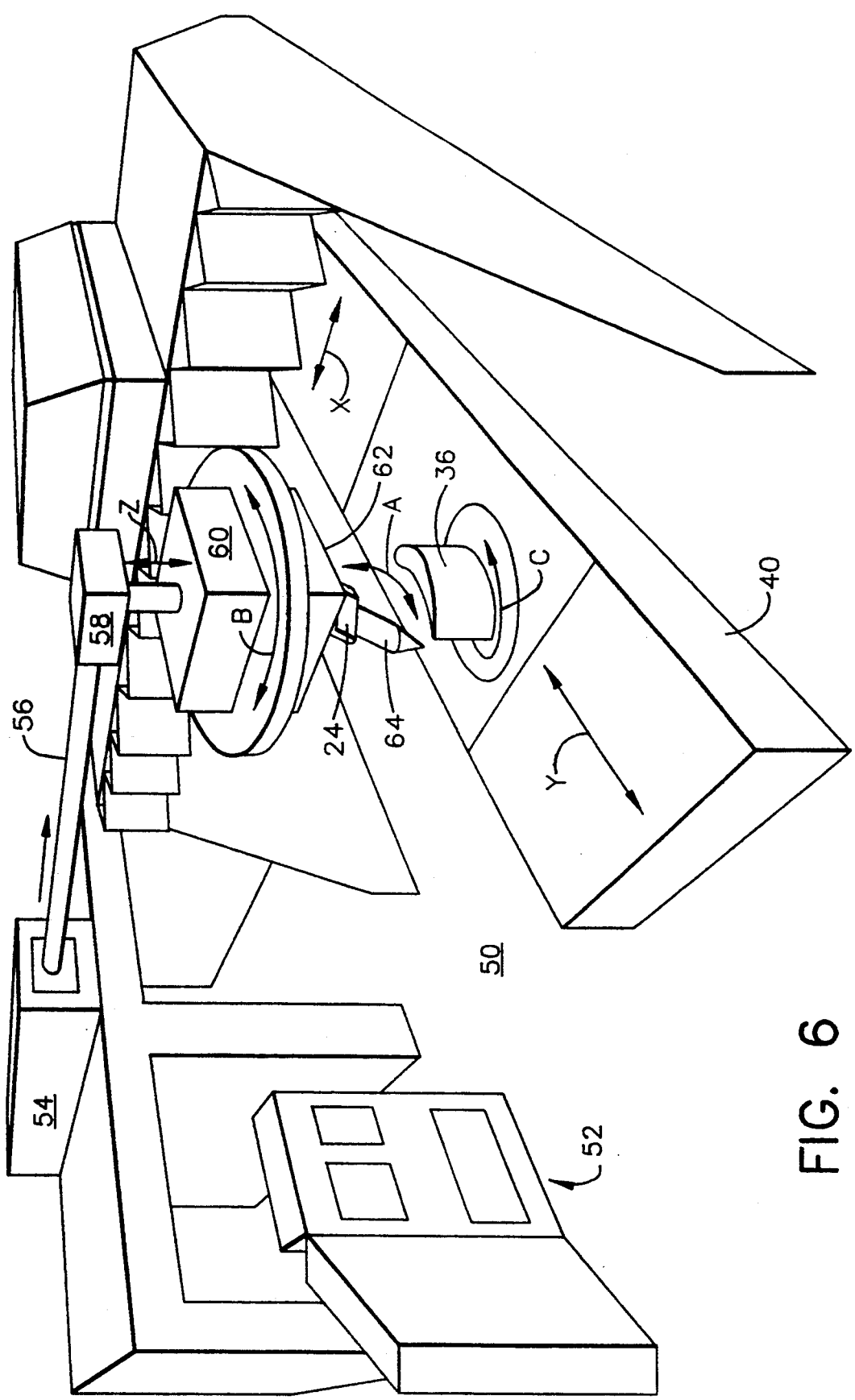
FIG. 6 is a schematic illustration of a numerical control apparatus (CNC) for performing the operations of FIGS. 3–5.

The various material processing operations described above, including the last described welding, are performed under the control of a six axis CNC laser machine tool 50 schematically illustrated in FIG. 6. Such machines 50 have been in use for other tasks, such as, laser welding, laser drilling and, in general, automated manufacturing processes, laser and otherwise, and represent a common practice for the expert in the art. Such CNC machines are well known in the industry, such as the S. E. Huffman HP Series, or the Raycon LPS Series Laser Machine Tools. The details of operation of such machines are known to those skilled in the art, therefore, it is believed that to understand the present invention the disclosure of such extraneous material is not necessary. In general, such machine tool 50 includes a CNC 52 which controls the entire operation. The laser beam, which preferably is a pulsed Nd:YAG laser is generated in laser generator 54 and is guided through a tube 56 to a mirror system 58 for deflecting the beam into a control means 60 including focussing and shutter arrangements and eventually to a laser gun 64. A means 62 to control the powder feed is also included in the control means 60. As can be seen in FIG. 6, the machine tool is capable of performing a six axis control (x; y; z; A; B; C) so that a workpiece 36 placed on the support 40 can be rotated, horizontally displaced, while the control means 60 and the gun 62 can be rotated in the A and B directions or up and down along the z-axis, as shown. As discussed in connection with FIG. 3, the HOE 24 is placed by the machine tool 50 into a recessed channel 30 of the workpiece 28 or 36, and under the control of the CNC 52 the beam focussing, timing, etc is performed. In the case of multiple HOEs, as discussed in connection with FIG. 5, where the HOEs 24 are mounted in the gun 64, the CNC 52 will shut the laser shutter in control means 60 once the irradiation of the first HOE and the associated component of the workpiece 36 has been completed. Then the CNC 52 will index the next HOE into place in the beam path and translate or rotate the workpiece, as necessary, to place the next component thereof into the beam path, then the CNC 52 will open the shutter in 60 to irradiate the HOE now on the beam path, which then deflects the laser energy on the associated component of the workpiece. The process is then repeated with respect to each HOE or repeated entirely depending on the amount of material required to be deposited on the tip, as mentioned earlier.

As discussed earlier, it is within the scope of the present invention to alter the image intensity distribution within a single HOE in order to keep the energy or heat deposition at a given location below damage thresholds. For example, the leading edge and trailing edge of most turbine components, such as those of turbine blades or buckets, are extremely susceptible to damage (severe melting) if the focussed laser beam were to dwell at or near these locations. By making the original object mask, used to record the HOE mask 12, dimmer in these areas, the resulting HOE image will also be less intense in these areas.

As can be seen from the above description, the use of HOEs according to the present invention will replace or minimize machine tool manipulations which can significantly impact cost and yield on certain component in aircraft engine manufacturing. For example, the HOE in addition to the above exemplary use, can also be used to deposit a small rectangular patch of material on the dovetail of a turbine component. This would eliminate the taping and masking steps, which are labor intensive processes, that are required to plasma spray the coating onto the component in manufacturing. Similar applications for the HOE can be found in nearly all coating applications.

While there has been described herein what is considered to be preferred embodiments and methods of the present invention, other modifications of the invention shall be apparent to those skilled in the art from the teaching herein and, it is, therefore, desired to be secured in the appended claims all such modifications as fall within the true spirit and scope of the invention.

Accordingly, what is desired to be secured by letters patent of the United States is the invention as defined and differentiated in the appended claims.

What is claimed is:

1. An apparatus for processing a material with a high intensity laser beam emitted from a laser source, comprising:

a reflective holographic optical means for reflecting said high intensity laser beam in the form of an image reflected onto a surface of said material under processing;

said holographic optical means further comprising a plurality of holographic optical elements, wherein each of said holographic optical elements is prepared in such a manner that a portion of said image is reflected by each holographic optical element;

wherein a surface of each of said holographic optical elements is prepared for controlling the intensity of a reflected laser beam according to a predetermined intensity pattern information contained is said holographic optical elements;

means for successively placing said holographic optical elements in the path of said high intensity laser beam for processing said material in successive steps; and means for interrupting said high intensity laser beam during the removing of one and placing of another of said holographic optical elements in the path of said high intensity laser beam.

2. The apparatus as claimed in claim 1, wherein said material under processing is located out of line-of-sight with respect to said high intensity laser beam emitted from said laser source.

3. The apparatus as claimed in claim 1, further including means for positioning said material under processing and including means for coordinating the path of said emitted high intensity laser beam with said means for positioning said material under processing.

4. A method of processing a workpiece with a high intensity laser beam emitted from a laser source, comprising the steps of:

positioning a holographic optical member in the path of said high intensity laser beam, said holographic optical member further comprising a plurality of holographic optical elements, wherein each of said holographic optical elements is prepared in such a manner that a predetermined portion of an image is reflected by each holographic optical element onto the workpiece under processing and a predetermined energy intensity information is contained in said holographic optical elements, said positioning step further comprising the successive indexing of said holographic optical elements into said high intensity laser beam path;

reflecting said high intensity laser beam from said holographic optical member onto said workpiece under processing; and performing said processing according to the image reflected by and energy intensity information contained in each holographic optical element in successive steps.

5. The method as claimed in claim 4, said workpiece under processing including a region which is located out of line-of-sight of said emitted high intensity laser beam.

6. The method as claimed in claim 4, wherein said processing comprises the depositing of a material in a predetermined pattern on said workpiece under processing.

7. A method of processing a workpiece with a high intensity laser beam emitted from a laser source, comprising the steps of:
 positioning a holographic optical member in the path of said high intensity laser beam, said holographic optical member having a surface prepared in such manner that an image of a workpiece is reflected onto the workpiece under processing and predetermined energy intensity information is contained in said holographic optical member;
 reflecting said high intensity laser beam from said holographic optical member onto said workpiece under processing; and
 performing said material processing according to a reconstructed workpiece image and said energy intensity information contained in said surface of said holographic optical member, wherein said reflected image is a composite image and performs a multiple task material processing, and wherein said multiple task material processing comprises the welding of a tip portion of a turbine component in successive steps.

8. An apparatus processing material with a high intensity laser beam emitted from a laser source, comprising:
 a reflective holographic optical means for reflecting said high intensity laser beam in the form of an image reflected onto a surface of the material under processing;
 wherein the surface of said holographic optical means is prepared for controlling the intensity of said high intensity laser beam reflected according to predetermined intensity pattern information contained in said holographic optical means; and
 means for introducing a powder stream into the path of the reflected high intensity laser beam at a region near the surface of said material under processing for initiating melting of said power by said high intensity laser beam and mixing with a part of surface melt of said material and creating a buildup of a predetermined thickness on said material under processing.

9. An apparatus for processing a workpiece with a high intensity laser beam emitted from a laser source, comprising:
 a reflective holographic optical means for reflecting said high intensity laser beam in the form of an image reflected onto a surface of said workpiece under processing;
 wherein the surface of said holographic optical means is prepared for controlling the intensity of said high intensity laser beam after reflection by said holographic optical means for performing a laser material processing operation in a predetermined pattern corresponding to predetermined pattern information contained in said holographic optical means, said predetermined pattern information causing said high intensity laser beam to have a selected non-gaussian intensity distribution profile to perform said laser material processing operation according to said selected intensity profile, wherein said laser material processing operation comprises deposition of at least one layer of material onto said workpiece surface according to said predetermined pattern; and
 means for positioning said holographic optical means at a predetermined relationship with respect to said workpiece under processing.

10. An apparatus for processing a workpiece with a high intensity laser beam emitted from a laser source, comprising:
 a reflective holographic optical means for reflecting said high intensity laser beam in the form of an image reflected onto a surface of said workpiece under processing;
 wherein the surface of said holographic optical means is prepared for controlling the intensity of said high intensity laser beam after reflection by said holographic optical means for performing a laser material processing operation in a predetermined pattern corresponding to predetermined pattern information contained in said holographic optical means, said predetermined pattern information causing said high intensity laser beam to have a selected non-gaussian intensity distribution profile to perform said laser material processing operation according to said selected intensity profile; and
 means for positioning said holographic optical means at a predetermined relationship with respect to said workpiece under processing, said positioning means comprising means for disposing said holographic optical means within a recessed channel of said workpiece, wherein said image is reflected onto a selected area of a wall of said channel to remove material according to said predetermined pattern.

* * * * *